(12) United States Patent
Osterweil (10) Patent No.: US 7,591,427 B2
(45) Date of Patent: Sep. 22, 2009

(54) METHOD AND SYSTEM FOR A STATIC MAGNETIC READ/WRITE HEAD

(76) Inventor: Josef Osterweil, 5411 Amberwood La., Rockville, MD (US) 20853

( * ) Notice: Subject to any disclaimer, the term of this patent is extended or adjusted under 35 U.S.C. 154(b) by 311 days.

(21) Appl. No.: 11/216,123

(22) Filed: Sep. 1, 2005

(65) Prior Publication Data

US 2006/0054699 A1 Mar. 16, 2006

Related U.S. Application Data

(60) Provisional application No. 60/608,478, filed on Sep. 10, 2004, provisional application No. 60/612,487, filed on Sep. 24, 2004.

(51) Int. Cl.
*G06K 7/08* (2006.01)
(52) U.S. Cl. ..................... 235/449; 235/450
(58) Field of Classification Search ............ 235/449, 235/450
See application file for complete search history.

(56) References Cited

U.S. PATENT DOCUMENTS

| 4,130,242 A | * | 12/1978 | Mannion | 235/450 |
| 4,306,215 A | * | 12/1981 | Jeffers | 338/32 R |
| 4,791,283 A | * | 12/1988 | Burkhardt | 235/438 |
| 5,834,756 A | * | 11/1998 | Gutman et al. | 235/493 |
| 6,141,161 A | * | 10/2000 | Sato et al. | 360/2 |

* cited by examiner

*Primary Examiner*—Jamara A Franklin (57) ABSTRACT

The present invention enables reading from and writing onto a magnetic stripe medium with a static read/write head that does not require relative linear motion between the magnetic stripe medium and the head while reading or writing takes place. The reading and writing is accomplished using a stationary uni-dimensional, bi-dimensional, or multi-dimensional conductor array addressing and driving current through an individual conductor element. Reading from magnetic stripe is accomplished by using magnetic flux sensing method such as a fluxgate.

20 Claims, 7 Drawing Sheets

*Prior Art*

Fig. 1

*Prior Art*

METHOD AND SYSTEM FOR A STATIC MAGNETIC READ/WRITE HEAD

RELATED DATA

The present invention is an extension of METHOD AND SYSTEM FOR DATA WRITING/READING ONTO/FROM AND EMULATING A MAGNETIC STRIPE PCT/US 04/10951 application filed on Apr. 19, 2004, as it relates to a static magnetic stripe write head. Present invention is also related to provisional applications: METHOD AND SYSTEM FOR STATIC MAGNETIC READ/WRITE HEAD 60/608,478 application filed on Sep. 10, 2004, and METHOD AND SYSTEM FOR STATIC MAGNETIC READ/WRITE HEAD 60/612,487 application filed on Sep. 24, 2004, as it relates to a static magnetic stripe read/write head.

FIELD OF INVENTION

Present invention provides a method and apparatus for magnetic stripe reading and writing where there is no relative motion between the read/write head and the magnetic stripe medium.

BACKGROUND AND RELATED INFORMATION

Current art magnetic stripe readers and writers use conventional magnetic heads where reading or writing occurs when the magnetic stripe moves along the head's air gap while the magnetic remanence transitions are converted to voltage in the head's coil (reading) and the magnetic induction at the air gap, strong enough to overcome the magnetic stripe's coercivity, creates a new remanence pattern (writing). While writing, the rate of change of the induction in the air gap in conjunction with the relative linear velocity between the head and the magnetic stripe determine the data density on the magnetic stripe. This density and the data's magnetic format are prescribed by industry standards for different data tracks on the magnetic stripe cards.

Consequently, card writing machinery has been carefully developed with precision moving parts so that data density and data format are maintained within the allowable prescribed tolerances. Most magnetic stripe card writers also read the card for content verification.

Magnetic stripe readers are less complex then writers in the sense that they can be swiped manually at a liberal range of speeds. The read circuitry synchronizes to the resultant variable data rate with the help of synchronization zeros on either end of the magnetic stripe.

Current art magnetic read and/or write heads wear-out as a consequence of repeated reading or writing that involves their abrasive swiping against the magnetic stripe material. The read or write performance deteriorates as a result of the wear and eventually fails altogether.

Current art magnetic stripe card readers require a card guiding slot of a certain length for stabilizing the swipe rate and, in this way, the magnetic stripe, while stationary, never encounters the read head. Magnetic stripe card writers are tasked to perform the more difficult task of maintaining the required data density. Both the reader and particularly the writer do not easily lend themselves to miniaturization for use in mobile devices.

Figure 1:
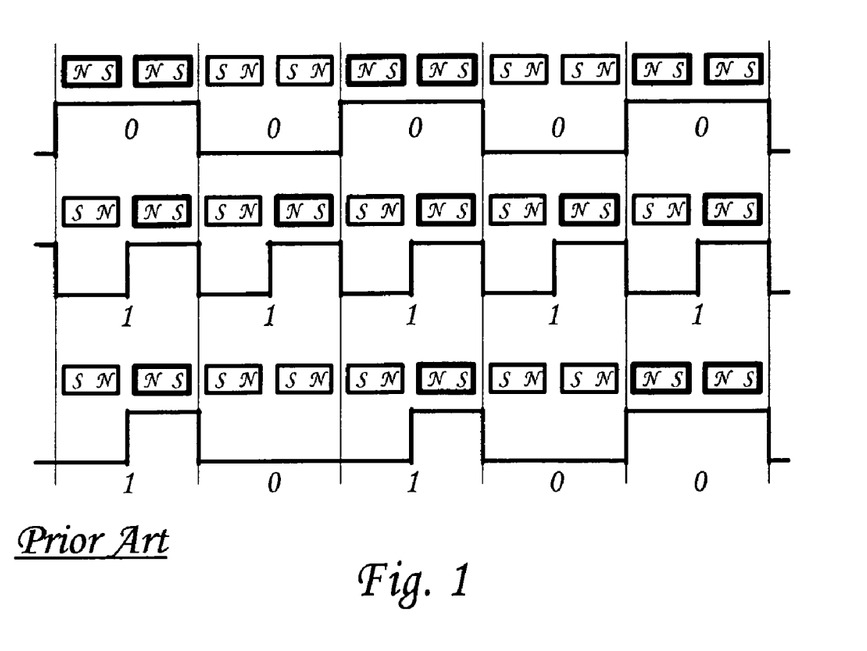
FIG. 1 illustrates a representation of encoded sequences of bits, in accordance with prior art Aiken Biphase encoding standard.

FIG. 1 shows three layout examples of magnetic stripe domain segments using Aiken Biphase encoding standards. The first line shows all zeros consisting of pairs of domains of alternating polarity. The second line shows all ones consisting of alternating polarities of a single domain—twice the frequency of the zeros. The third line consists of a combination of ones and zeros (10100).

Figure 2:
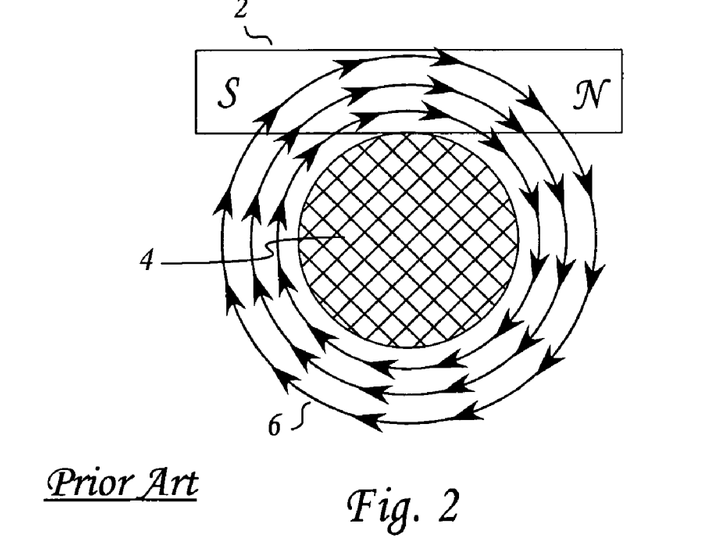
FIG. 2 illustrates a cross-section front view of a conductor and related magnetic field for illustrating the principles of magnetism, electric current, and the relationship between them.

FIG. 2 shows current flowing through a conductor 4 (illustrated in cross-section) that generates a magnetic field 6 of strength H (around the conductor 4). The strength of the magnetic field H complies with the following expression:

$$H = \frac{I}{R}$$

I is the current in the conductor and R is the radius (distance) from the center of the conductor 4 to the location of interest where the magnetic field 6 H is measured. The direction of the magnetic field 6 H is clockwise as indicated by the arrows on the magnetic field lines 6, and corresponds to a current direction in the conductor 4 that is perpendicular to the page and flows in a direction from the viewer into the page.

As is further shown in FIG. 2, a thin magnetic stripe layer segment 2 is located in close proximity to the conductor 4. The flow through the conductor imposes a magnetic field with polarity of the North Pole (N) and South Pole (S), as indicated in FIG. 2. The SN poles illustrated in FIG. 2 constitute a magnetic domain; each track in the magnetic stripe layer includes a plurality of magnetic domains placed in a straight line. When the current direction is reversed in a direction from the page to the viewer, the direction of the magnetic field is reversed to counterclockwise, and so are the S and N polarities on the magnetic stripe (not shown). The magnetic field strength 6 must be intense enough to overcome the coercivity of the magnetic stripe 2 material. Since the magnetic field is proportional to the current in the conductor 4, it is necessary to reach a balance between the magnitude of the current pulse and the coercivity of the magnetic material. Once the magnetic polarity on the magnetic stripe 2 has been set by the current, the current flow can be stopped and the BR (Induction Remanence) imprint on the magnetic stripe will remain in that setting until reversed by a reverse current in the conductor 4 or by an external magnetic field that is strong enough to overcome the coercivity of the magnetic stripe 2. Thus, current impulses of the right magnitude and direction are sufficient to imprint data on the magnetic stripe material.

Note that it is desirable to minimize the magnitude of the current pulses so that current levels and their current driver design and production become achievable with no difficulty. However, the lower the coercivity of the magnetic stripe material, the more susceptible is the magnetic stripe to inadvertent modification by external magnetic fields.

Figure 3A:
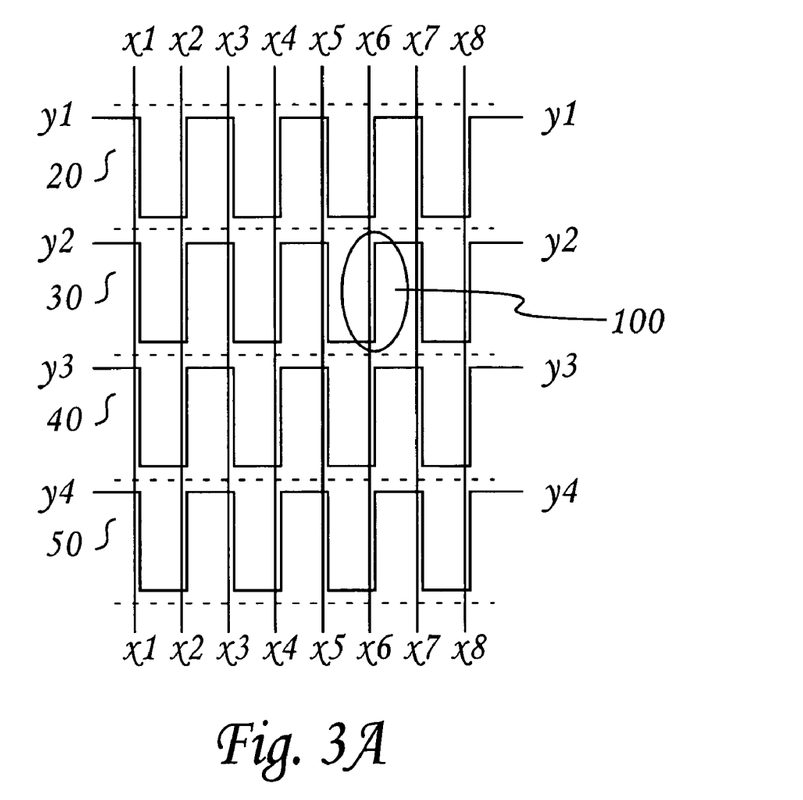
FIG. 3A illustrates yet another matrix conductor array example of a single track layout, in accordance with an embodiment of an aspect of the invention.

In accordance with PCT/US 04/10951, there is provided a bi-dimensional or multi-dimensional conductor array that is proximate to the magnetic stripe that copes with the shortcomings of the hitherto known solutions. FIG. 3A illustrates a non-limiting embodiment of this aspect of PCT/US 04/10951 utilizing a matrix conductor array.

Thus, as shown, two substantially proximate conductors are associated with each domain, allowing a selection of each domain by the sum of currents within the two conductors. (As may be recalled from PCT/US 04/10951, two domains constitute a single bit). Therefore, the sum of two currents flowing in the same direction is designed to overcome the coercivity of the magnetic stripe for each domain, whereas each current alone or two opposing currents will not. In FIG. 3A, current through lines y2-y2 and x6-x6 that together become a higher total current at domain 100 is an example of such matrix domain selection. This approach is akin to the selection process of a single core in a magnetic core memory that allows the selection to be accomplished in the form of a matrix, and consequently uses fewer current drivers.

Thus, a matrix having A rows and B columns can support up to A·B entries, i.e. bits. For instance, in the case of 500 bits, 1000 domains are required and, thus, a 32 over 32 matrix can be employed so that any one of the 1000 domains (or up to 1024 domains) is controlled by a unique (i,j) entry. Accordingly, 64 lines are required to write any desired bit in the series of 500 bits.

Figure 3B:
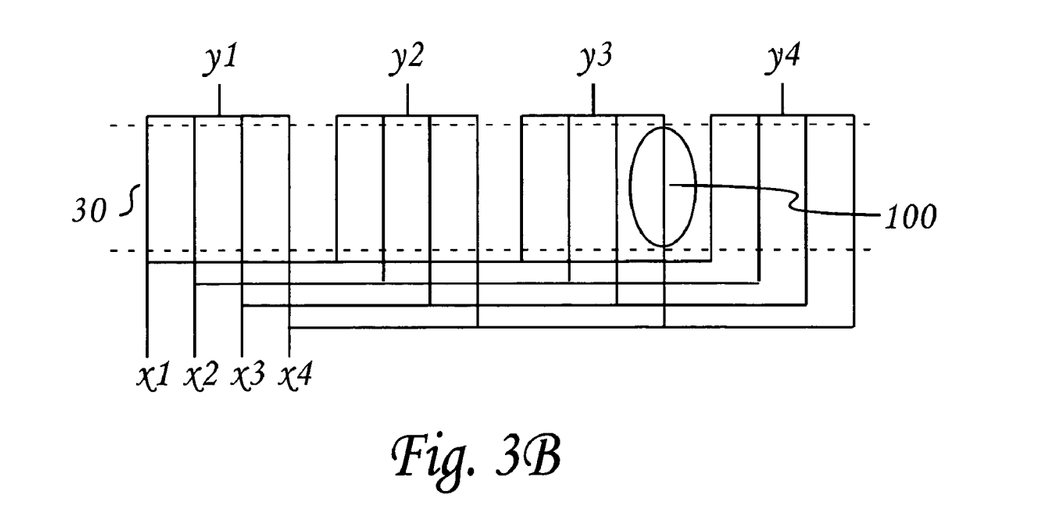
FIG. 3B illustrates yet another matrix conductor array example of a single track layout, in accordance with an embodiment of an aspect of the invention.

Another matrix example is illustrated in FIG. 3B. This matrix is two-dimensional and reduces the number of necessary drivers in the same manner as the matrix described in FIG. 3A. However, the objective of this example is to emphasize a minimum number of conductors per bit. Consequently, a single conductor will be driven with enough current to overcome the coercivity of the magnetic stripe material, where the drivers y3 and x4 selectively drive conductor element 100. All drivers in this example are bidirectional and drive current in the direction dictated by the data content. This matrix example is important in cases where the technology reaches yield degradation at the range of high conductor densities.

SUMMARY OF THE INVENTION

In accordance with the present invention, there is provided one of a reading from and of a writing onto a magnetic stripe medium with a static read/write head that does not require relative linear motion between the magnetic stripe medium and the head while reading or writing takes place.

In accordance with an embodiment of the present invention, there is provided an improved read/write head that can be used to write onto a magnetic stripe card, for example, and then proceed to read the content of the magnetic stripe for content verification while the magnetic card and the head remain motionless. The stationary reading and writing is accomplished using a stationary uni-dimensional, bi-dimensional, or multi-dimensional conductor array such as a bi-dimensional matrix without moving parts that selects writing (current flow) to each conductor by addressing individual conductor elements (drive coils), or at least two matrix coordinates. This matrix simplifies the complexity of the electronic drivers that inject current into each conductor element. As will be explained in greater detail below, such reduced complexity leads to certain advantages, including reduced manufacturing and retail costs.

There is provided, in accordance with the present invention, an advantage of enhanced matrixes where current flows in the selected conductor element while all stray currents (in undesired conductor elements) are eliminated.

There is provided, in accordance with the present invention, an advantage of being able to perform additional processes, such as card printing, embossing, etc., that can take place simultaneously with the magnetic stripe writing and/or reading while the card remains motionless.

There is provided, in accordance with the present invention, an advantage of the read/write head in that it is compact and does not require a guiding slot, therefore it is more suitable for mobile applications.

There is provided, in accordance with the present invention, an advantage of the read/write head as a stationary device of at least one of reading and of writing, that minimizes wear and tear of the head caused by abrasion in conventional heads due to the swiping action.

There is provided, in accordance with the embodiment of a first aspect of the invention, a method of data reading from magnetic stripe by using at least one of a fluxgate method and of a modified fluxgate method.

There is provided, in accordance with the embodiment of a second aspect of the invention, a method of data reading from magnetic stripe by using at least one of a Hall Effect method and of a modified Hall Effect method.

The invention further provides for a system of at least one of reading data from and of writing data onto a magnetic stripe of a card, comprising a device capable of at least one of reading from and of writing data onto the magnetic stripe being placed in proximity thereto, such that the device is characterized as having no dependence on moving parts.

The invention establishes a method for precisely measuring the level in a given direction of a magnetic field i.e. the measurement of a magnetic field vector.

BRIEF DESCRIPTION OF THE DRAWINGS

For a better understanding, the present invention will now be described, by way of example only, with reference to the accompanying drawings, in which.

DETAILED DISCLOSURE OF THE INVENTION

Figure 3C:
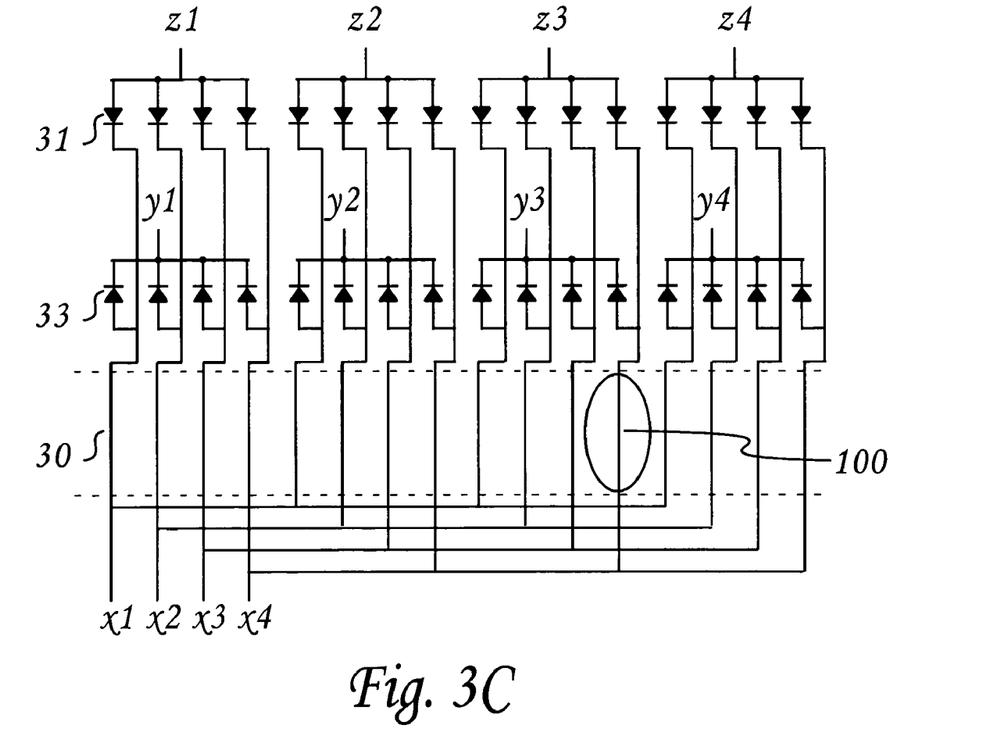
FIG. 3C illustrates yet another matrix conductor array example of a single track layout that is further enhanced, in accordance with an embodiment of an aspect of the invention.

In the matrixes of FIGS. 3A and 3B the process of a driving conductor element 100 allows current flow of a prescribed magnitude to overcome the coercivity of the magnetic stripe during the write process. However, in both matrixes current also flows in other elements (stray current) at levels below that of the conductor element 100 so that coercivity of the magnetic stripe is not overcome and its data is not overwritten and corrupted. While these stray currents place a higher demand on the current source, they do not interfere with the write process. As will become evident from the preferred magnetic stripe read embodiments below, the matrix is used for read signal excitation of each magnetic stripe domain—one conductor element at a time. Therefore, the read process is less forgiving of the presence of these stray currents. The stray currents in the current elements that have not been selected contribute to an undesired noise, thus degrading the signal-to-noise ratio of the read output signal. FIG. 3C is an example of an enhanced matrix that eliminates stray currents in any conductor elements other than the selected conductor element 100. This enhanced matrix is a derivative of the matrix of FIG. 3B with two rows of steering diodes 31 and 33 with additional conductor element selection terminals.

The x terminals of FIG. 3C are connected to bidirectional current drivers, the y terminals are connected to unidirectional current drivers of the sink type, and the z terminals are connected to unidirectional current drivers of the source type. The matrix of FIG. 3C selects conductor element 100 for current flow towards terminal x4 by using x4 in the sink mode and terminal z3 as source. For current flow from x4 in conductor element 100, x4 is used as a source in conjunction with sink terminal y3. In both cases, tray current paths are eliminated by the steering diode banks 31 and 33.

Figure 4A:
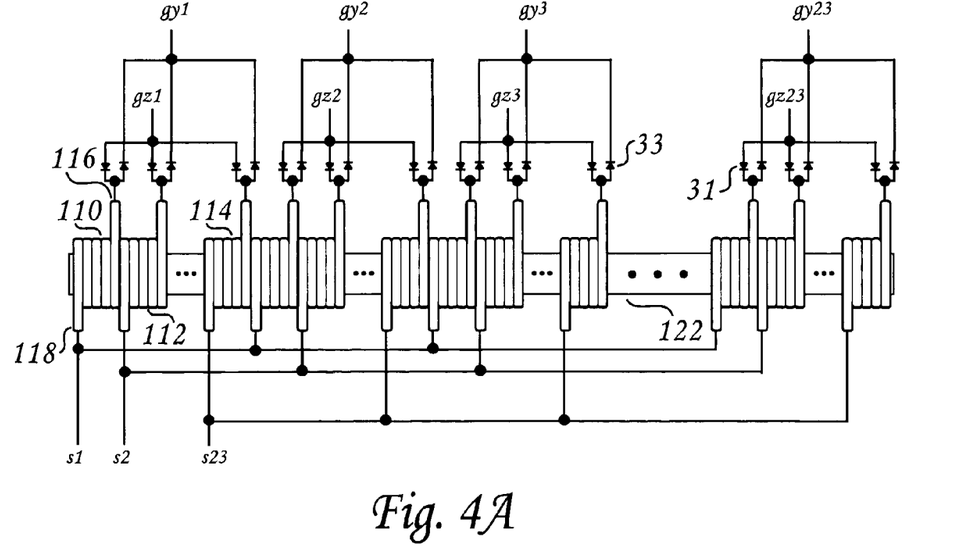
FIG. 4A illustrates an application of the matrix conductor array of FIG. 3B in track-two of a standard magnetic stripe card in accordance with an embodiment of a n aspect of the invention.
Figure 4B:
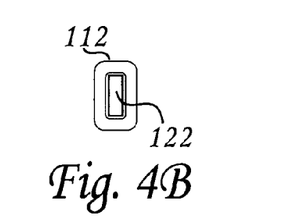
FIG. 4B illustrates the cross-section of the matrix application of FIG. 4A.

FIG. 4A illustrates a configuration example of track-two on a magnetic stripe card. This track is composed of 23 groups of 23 conductor elements (drive coils) each, resulting in a track of five hundred twenty nine (529) total conductor elements, each assigned to a single domain segment of track-two on the magnetic stripe card. FIG. 4A shows each conductor element as a five (5) turn drive coil 110, 112, and 114, around a substrate 122 with terminals 116 and 118. However, the number of turns is a function of the diameter of the wire used, the available current, and the size of the required domain segment. Even a single conductor can represent the entire drive coil for a domain segment. For writing onto magnetic stripe domains that are predictably encoded in a particular manner such as with leading synchronization zeros, lead symbols, and/or field delimiters, the representative drive coils can be concatenated and be driven as a single drive coil by a single current driver set. Note that one terminal 116 of each drive coil of a group (23 coils) is tied to two steering diodes and is labeled as gy1, gy2, through gy23 for sink current drivers selection through one of the diodes and as gz1, gz2, through gz3 for source current drivers selection through the other diode. The other coil terminal 118 of the first drive coil of each group is tied together and labeled s1 and the other terminal of the second coil of each group is labeled s2, and so on through s23, for bidirectional selection current drivers. Other configurations of conductor arrays such as uni-dimensional, bi-dimensional or multi-dimensional are applicable, all as required and appropriate and are not necessarily confined to the matrix configuration. By selecting s2 and gz1, the second coil 112 from the left is selected for current flow towards s2. Current can also flow from s2 to gy1. The direction of the current depends on the current drivers' settings (not shown). UND 2949 Z is one example of a suitable bidirectional current driver. Note that the invention is not bound by the specific matrix architecture illustrated in FIG. 4A, or the use of any substrate, current steering method, or any specific current driver. FIG. 4B illustrates the cross-section of the coil 112 and the substrate 122. So far, the description includes features of a magnetic stripe writer. Subsequently, modifications to this basic structure with read and write capabilities are described.

Figure 5A:
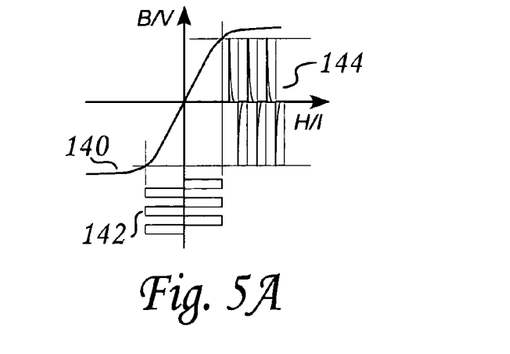
FIG. 5A illustrates a sense coil, with a ferromagnetic core and output voltage as a function of a drive coil square wave excitation without an external magnetic field on an H/I-B/V graph in accordance with an embodiment of an aspect of the invention.

FIG. 5A illustrates a typical Voltage (V) 144 generated as a result of variations in induction B, as a function of magnetic field (H), resulting from the current (I) 142, when a ferromagnetic material is used as a core for a coil. Note that by injecting a square wave excitation current 142 into one coil, the voltage output 144 of a second coil sharing a common ferromagnetic core is symmetrical. The output voltage according to Lenz's Law is as follows:

$$v = -NA\frac{dB}{dt} \text{ Where}: B = \mu H$$

V is the output voltage 144; B is the induction; H is the magnetic field; □ is the permeability of the core material; A is the area of the core's cross-section; and N is the number of turns of the sense coil 126 that are exposed to the induction B.

Figure 5B:
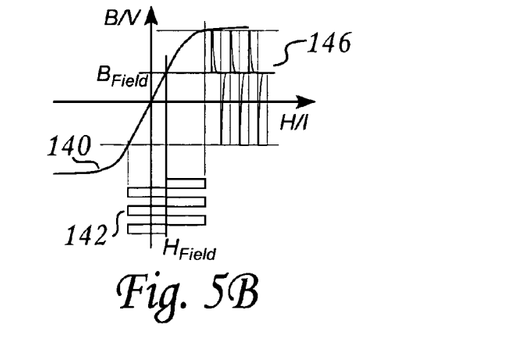
FIG. 5B illustrates a sense coil, with a ferromagnetic core and output voltage as a function of a drive coil square wave excitation with an external magnetic field on an H/I-B/V graph in accordance with an embodiment of an aspect of the invention.

FIG. 5B illustrates the output voltage 144 of the second coil in the presence of an external magnetic field $H_{field}$, causing $B_{field}$. This forces the current 142 into the nonlinear part of the curve 140 and results in an asymmetrical and/or attenuated output voltage 144. This principle, used in fluxgate magnetic field measuring systems, is exploited for magnetic stripe read capability. It is further modified for improved read capability and is described in greater detail below.

Figure 6A:
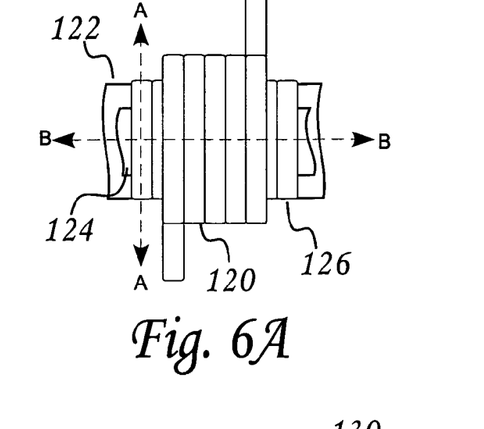
FIG. 6A illustrates a segment of the drive coil wrapped around the sense coil with a ferromagnetic core and a substrate in accordance with an embodiment of the first aspect of the invention.
Figure 6B:
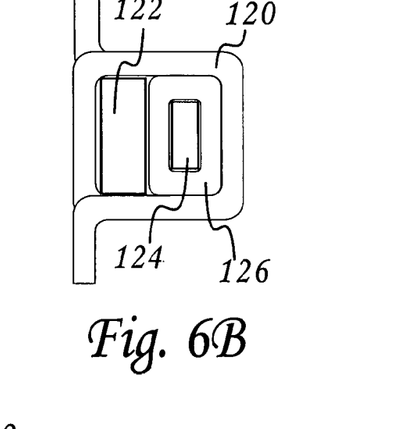
FIG. 6B illustrates the A-A cross-section of the illustration of FIG. 6A.

FIG. 6A illustrates a configuration example of a single drive/excitation coil 120 wrapped around a sense coil 126. The sense coil is wrapped around a ferromagnetic core 124 and the system may be physically reinforced by using a substrate 122. If the core can provide the necessary rigidity, the additional substrate becomes unnecessary. FIG. 6B shows cross-section A-A of FIG. 6A and illustrates an example of spatial relationship between the drive (excitation) coil 120, the sense coil 126, the ferromagnetic core 124, and the optional substrate 122. Note that there is only one sense coil 126 used along the entire read/write head in this example whereas there are multiple drive/excitation coils as discussed above.

Figure 6C:
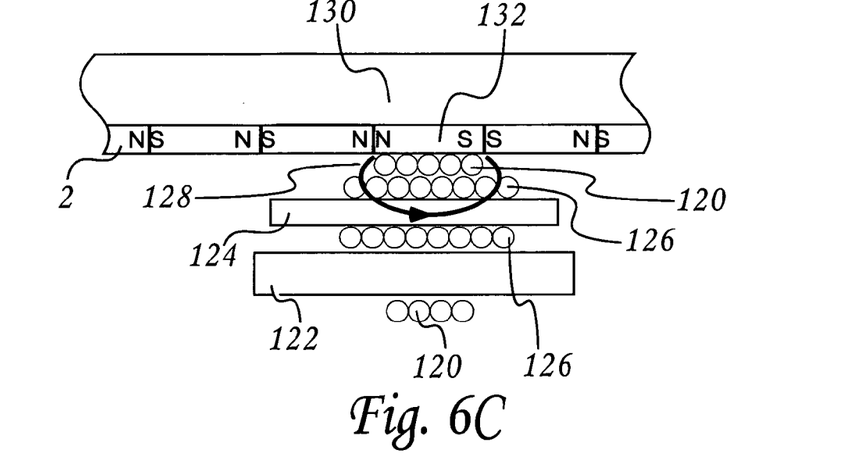
FIG. 6C illustrates the B-B cross-section of the illustration of FIG. 6A.

FIG. 6C illustrates cross-section B-B of FIG. 6A, proximate a segment of the magnetic stripe 2, and a card 130. Note that because of its high permeability □ of the ferromagnetic material of the core 124, the magnetic induction (B) 128 emanating from the magnetic stripe domain 132 is concentrated primarily in the core 124. This magnetic induction 128 constitutes an external induction field labeled $B_{field}$ in FIG. 5B. The intensity of the $B_{field}$ and the curve 140 (in FIG. 5B) which is a characteristic of the magnetic core 124, determines the attenuation and/or distortion (for example asymmetry) of the output voltage of the sense coil 126 resulting from a current signal, such as a square wave, for example, injected into the drive/excitation coil 120. This attenuation and distortion provides a clue as to the polarity $B_{field}$ 128 emanating from the domain segment 132 and $B_{field}$'s 128 intensity (its remanence). The read task requires the determination of the domain segment 132 emitted $B_{field}$'s 128 polarity but not its remanence intensity. The polarity can be determined by analysis of the distortion and/or attenuation characteristics of the sense coil 126 output voltage 144. The polarity can also be determined without complex circuitry by introducing a positive induction bias ($B_{bias}$) and a negative induction bias $B_{bias}$ while comparing the induced voltage 144 in the sense coil 126. If $B_{bias}$ is of the same polarity as is $B_{field}$ 128, the ferromagnetic core 124 goes deeper into its nonlinear saturation region and, for example, the sense coil 126 output is further attenuated. If $B_{bias}$ and $B_{field}$ 128 are of opposite polarity, the fields partially cancel each other out and the core 124 becomes less saturated and the sense coil's 126 output voltage 144 is less attenuated.

The positive and negative bias $B_{bias}$ is induced by a bias current that is added to the drive/excitation coil 120 signal 142 (square wave for example) where positive current provides bias in one direction whereas negative current creates bias in the opposite direction. Note that both the signal and the bias currents may not exceed a value that might overwrite the data on the magnetic stripe during a read cycle. Bias $B_{bias}$ may also be introduced by injecting a positive or a negative bias current into the sense coil 126 with the same end result and with less circuit complexity. Furthermore, a third coil dedicated to the $B_{bias}$ bias function, may be introduced.

Note that the invention is not bound by the specific methodology of evaluating the sense coil's 126 output voltage 144 or by the method of achieving an induction bias $B_{bias}$ for simplifying the sense coil 126 output voltage 144 evaluation process. Note also that the invention is not bound by the specific method of bias introduction, its magnitude, its polarity, or whether single or multiple bias attempts per measurement are used. For example, if the drive/excitation coils also assumed the sense coil function, the bias current must then be supplied to each drive coil and the measurement would consist of the effective inductance of each coil.

Figure 6D:
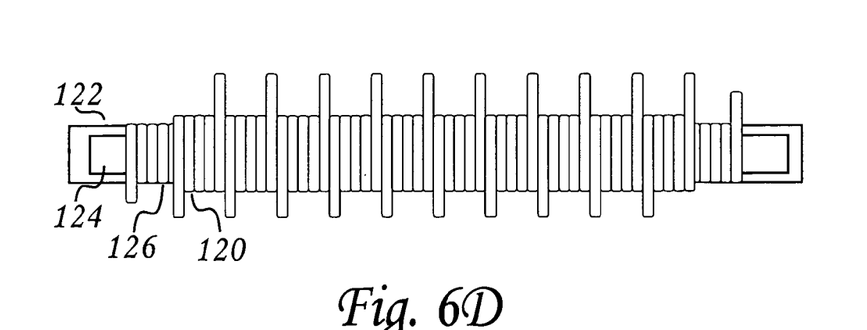
FIG. 6D illustrates a multi-segment section of the drive coil wrapped around the sense coil with a ferromagnetic core and a substrate in accordance with an embodiment of the first aspect of the invention.

FIG. 6D illustrates a section of a track with multiple concatenated drive/excitation coils 120, a single sense coil 126, core 124, and substrate 122. This configuration represents the preferred embodiment of the first aspect of the present invention but is by no means bound by this configuration.

Figure 7A:
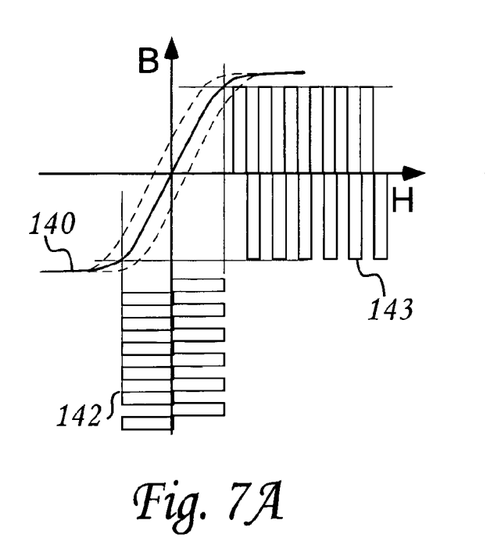
FIG. 7A illustrates a sense coil with a ferromagnetic core and output induction as a function of a square wave magnetic field excitation without an external magnetic field on an H-B graph in accordance with an embodiment of the first aspect of the invention.

FIG. 7A through FIG. 7D are presented to better clarify the modified fluxgate aspect of this invention. FIG. 7A illustrates induction B output 143 as a function of a square wave magnetic field 142 excitation and the hysteresis curve 140 of a ferromagnetic core without an external field. Similar to FIG. 5A, the induction B output 143 is symmetrical.

Figure 7B:
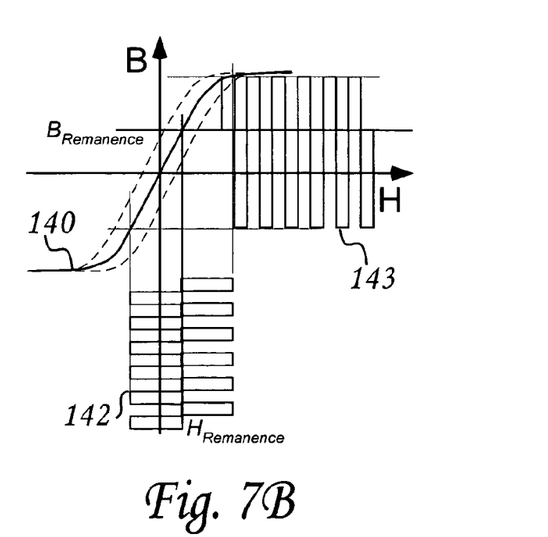
FIG. 7B illustrates a sense coil with a ferromagnetic core and output induction as a function of a square wave magnetic field excitation with an external magnetic field on an H-B graph in accordance with an embodiment of the first aspect of the invention.

FIG. 7B illustrates induction B output 143 as a function of a square wave magnetic field 142 excitation and the hysteresis curve 140 of a ferromagnetic core in the presence of an external field $H_{Remanence}$. Similar to FIG. 5B, the induction B output 143 is asymmetrical.

Figure 7C:
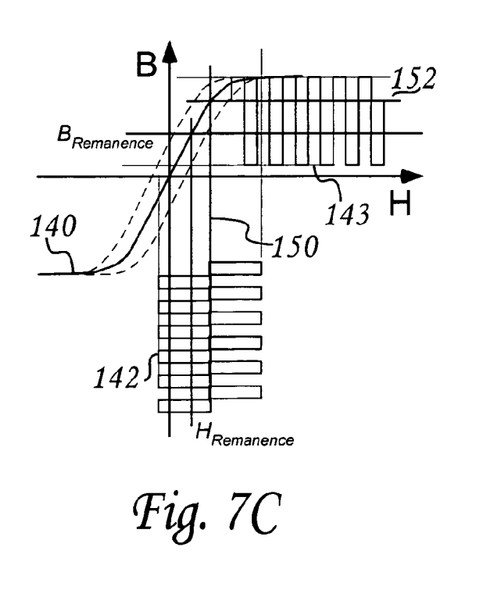
FIG. 7C illustrates a sense coil with a ferromagnetic core and output induction as a function of a square wave magnetic field excitation with an external magnetic field and a positive bias field on an H-B graph in accordance with an embodiment of the first aspect of the invention.

FIG. 7C illustrates induction B output 143 as a function of a square wave magnetic field 142 excitation and the hysteresis curve 140 of a ferromagnetic core in the presence of an external field $H_{Remanence}$ and positive magnetic field bias 150. The magnetic field bias 150 shifts the induction B 152 in the positive direction. This shift drives the core further into deeper saturation as evident on the hysteresis curve 140. The result is further attenuation of the induction B 152 square wave component.

Figure 7D:
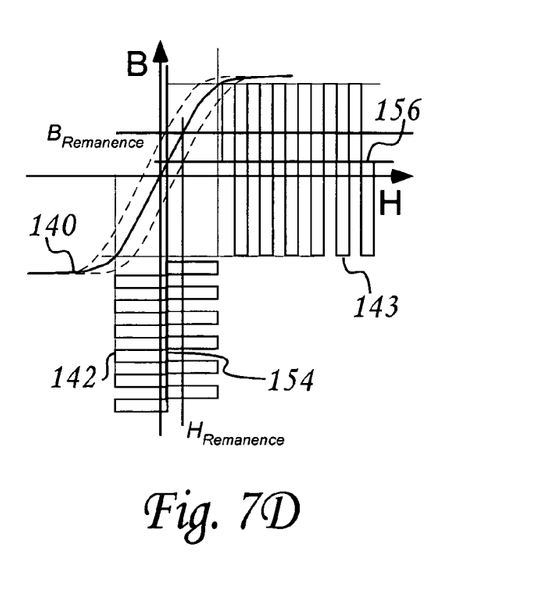
FIG. 7D illustrates a sense coil with a ferromagnetic core and output induction as a function of a square wave magnetic field excitation with an external magnetic field and a negative bias field on an H-B graph in accordance with an embodiment of the first aspect of the invention.

FIG. 7D illustrates induction B output 143 as a function of a square wave magnetic field 142 excitation and the hysteresis curve 140 of a ferromagnetic core in the presence of an external field $H_{Remanence}$ and negative magnetic field bias 154. The magnetic field bias 154 shifts the induction B 156 in the negative direction. This shift drives the core towards the linear portion on the hysteresis curve 140. The result is amplification of the induction B 156 square wave component. The shift in amplitude of the induction square wave component from positive magnetic field bias to negative magnetic field bias is a clear and easily detectible indication as to the polarity of the magnetic stripe domain field $H_{Remanence}$. Note that this invention is not bound by this example of fluxgate modification for polarity and/or magnitude determination of an external magnetic field.

Figure 8A:
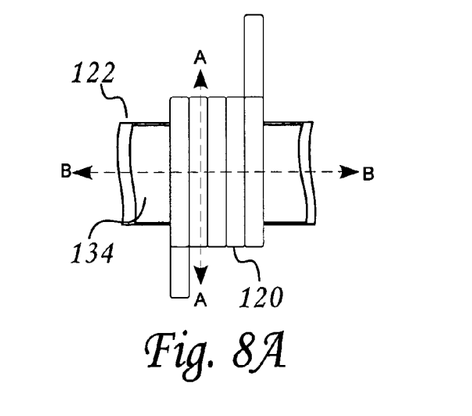
FIG. 8A illustrates a segment of the drive coil wrapped around a substrate with conductive clad in accordance with an embodiment of the second aspect of the invention.
Figure 8B:
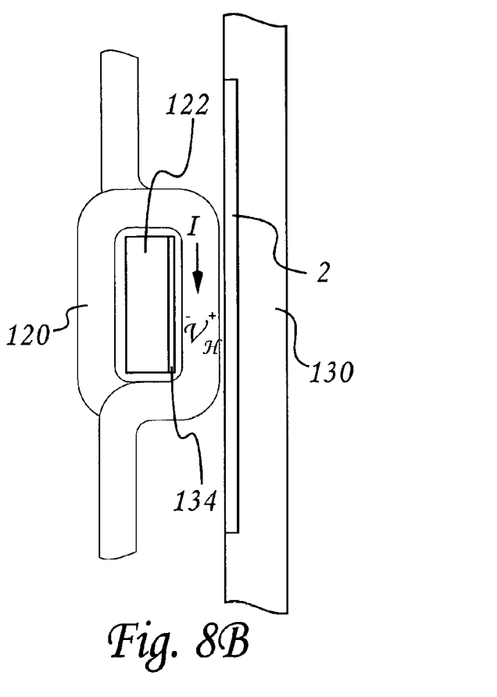
FIG. 8B illustrates the A-A cross-section of the illustration of FIG. 8A.

FIG. 8A illustrates an example configuration of a single drive/excitation coil 120 wrapped around a substrate 122 and a conductive surface 134. The substrate 122, for example, printed circuit material available with copper clad 134, is suitable for this purpose. FIG. 8B shows cross-section A-A of FIG. 7A and illustrates the special relationship between the drive/excitation coil 120 and the conductive clad 134. Note that in this example there is only one conductive clad 134 used along the entire read/write head whereas there are multiple drive/excitation coils. This embodiment is based on Hall Effect in the coil 120 material. Note that different materials display different $K_H$.

$$V_H = \frac{K_H B I}{z}$$

$V_H$=Hall Effect voltage; $K_H$=Hall Effect constant; B=flux density of magnetic field; I=current flowing through conductor; z=thickness of conductor.

Note that the coil 120 develops a voltage $V_H$ as a function of the current I and the magnetic induction B 128 emanating from the magnetic stripe 2. The magnetic induction B 128 is strongest in the coil 120 side proximate the magnetic stripe and that is where the highest voltage $V_H$ is measured as it is marked on FIG. 8B by the + and − symbols.

$V_H$ is measured only to determine the polarity of the voltage as a representative of the polarity of the magnetic induction B 128 of the specific magnetic stripe domain being read. The preferred reading methodology of the second aspect of the present invention is by capacitive coupling between the drive/excitation coil 120 and the conductive clad 134. The voltage is measured, for example, between the clad 134 and one of the drive/excitation coil 120 terminals. Note that the invention is not bound by the specified measurement realization.

Figure 8C:
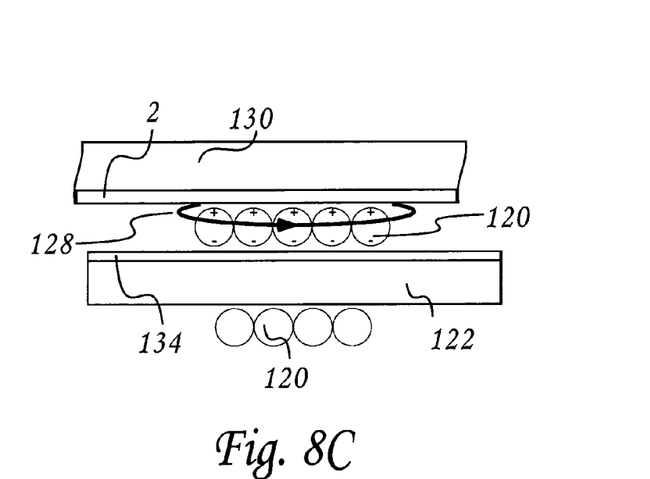
FIG. 8C illustrates the B-B cross-section of the illustration of FIG. 8A.

FIG. 8C illustrates cross-section B-B of FIG. 8A proximate a segment of the magnetic stripe 2 and a card 130. Note that the magnetic induction B 128 emanating from the magnetic stripe 2 is strongest at the top layer of the drive/excitation coil 120 and that is where the highest voltage $V_H$ is measured as it is marked on FIG. 8C by the + and − symbols.

Note that copper windings display a relatively low $K_H$ constant which will yield a low level voltage $V_H$. This invention is not bound by the use of a specific material for realization of the drive/excitation coil 120 and for optimizing the Hall Effect constant $K_H$.

Figure 8D:
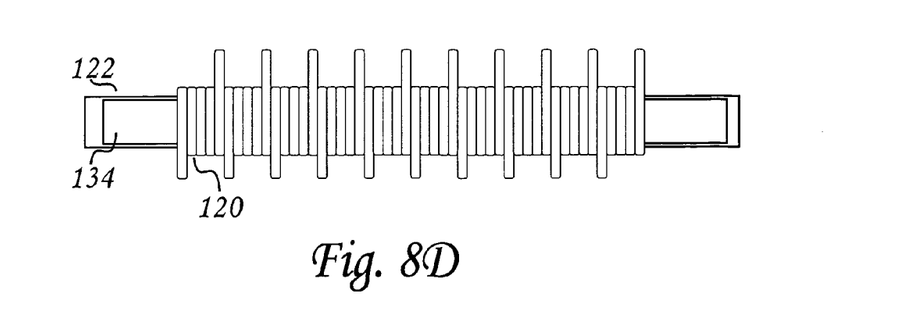
FIG. 8D illustrates a multi-segment section of the drive coil wrapped around the substrate with a conductive clad in accordance with an embodiment of the second aspect of the invention.

FIG. 8D illustrates a section of a track with multiple concatenated drive/excitation coils 120, a single conductive clad 134, and substrate 122. This configuration represents the preferred embodiment of the second aspect of the present invention but is by no means bound by this configuration. Note that the elimination of stray currents is of great importance if a single sense clad capacitive coupling is used—not illustrated.

The present invention is best suited to read the magnetic stripe for verification of a preceding writing process before the magnetic stripe card has been moved from its position on the read/write head. In this position, the magnetic stripe domains are perfectly aligned with the drive/excitation coils that established the domains during the writing sequence. However, when a magnetic stripe card is placed against the present read/write head, there is no assurance that the existing domains will be precisely aligned with the drive/excitation coils. Misalignment causes read degradation that is proportional to the degree of misalignment. At 50% alignment offset, reading is not possible at all. This issue can be overcome, for example, by doubling the number of drive/excitation coils and reducing the length of each coil to half of the magnetic domain size. In this way, at least one of the two coils will face, over its entire length, only one domain's field $H_{Remanence}$. This way, at least every other drive/excitation coil can generate a reliable signal for $H_{Remanence}$ polarity determination.

The modified fluxgate, described above, can also be used for precise magnetic field vector measurement. The process involves, for example, a similar structure to FIG. 4A with a single drive/excitation coil and a single sense coil. For a single drive/excitation coil, the matrix configuration and the steering diodes are superfluous. The structure (probe) must be calibrated before a measurement is attempted. For best results, the probe is placed in a magnetically shielded container that prevents any ambient magnetic field from reaching the measuring structure. The calibration involves obtaining the probe's sense coil output while the sense coil has no bias current; by storing the output voltage curve; by recording parameters of the curve; or other methods that make it possible to compare and correlate the calibration voltage curve with other curves derived during the measurement process. A triple sensor with orthogonal cores and coils, for example, can derive each vector component without having to move the probe.

Measurement example of a magnetic field vector is executed by placing the probe's core in any desired direction at the spot where the field is to be measured. While the probe is stationary at the above spot, a bias current is introduced that is varied until the probe's sense coil voltage curve can be best correlated to the calibration voltage curve. The bias current value and its polarity represent the magnetic field vector component along the core axis. Repeating this process when the core is oriented in two additional directions that are not coplanar, provides a total of three vector components that are the basis for deriving a precise magnetic field vector.

Another measurement example involves twirling the probe in different directions with a fixed bias until a maximum correlation with calibration data is established. In that position, the core points in the direction of the measured vector of the magnetic field. While maintaining direction, the current is adjusted for maximum correlation to derive the absolute value of the vector.

Current variations in search of maximum correlation with calibration data can be accomplished by using binary successive approximation for fast convergence to the desired value. However, this invention is not limited by any specific convergence methodology.

The invention claimed is:

1. A method of statically writing data on a magnetic stripe of a magnetic stripe card that requires no card internal circuitry by externally imposing magnetic field of a given polarity on each selected segment of the magnetic stripe and of reading data by sensing the remanent field of each segment of the magnetic stripe by multiple fluxgate that are sharing a sense coil method that is external to the card such that data on the magnetic stripe can also be read by a swipe magnetic card reader and interpreted as digital bits, comprising:
    (i) providing a multi-dimensional conductor array placed proximate to the magnetic stripe where each magnetic stripe segment is associated with at least one conductor;
    (ii) providing current drivers for sending currents in controlled directions through the conductor array;
    (iii) sending said currents, using said current drivers, through conductors of the array, such that during writing, the composite current in a conductor overcomes the coercivity of a given segment of the magnetic stripe;
    (iv) a sense coil wrapped around a ferromagnetic core and shared with the conductor array is used as part of multiple fluxgates that during reading senses at least the polarity of each segment using a fluxgate method while the conductor arrays of each segment, independently, induce flux into the core using current that does not overcome the coercivity of the magnetic stripe;
    (v) a magnetic domain matrix addressing method for both reading from and writing onto the magnetic stripe.

2. The method according to claim 1, wherein the read process utilizes a fluxgate method.

3. The method according to claim 1, wherein the read process utilizes a modified fluxgate method.

4. The method according to claim 1, wherein each segment is a magnetic domain, and wherein data read from two succeeding domains corresponds to one bit.

5. The method according to claim 1, wherein said data bits comply with the Aiken Biphase code.

6. The method according to claim 1, wherein said multi-dimensional conductor array is a uni-dimensional conductor array.

7. The method according to claim 1, wherein said multi-dimensional conductor array is a two-dimensional matrix conductor array.

8. The method according to claim 1, wherein said multi-dimensional conductor array is a two-dimensional matrix conductor array with current steering mechanism.

9. The method according to claim 1, wherein a track of magnetic stripe complies with the American National Standards Institute (ANSI) & ISO/IEC.

10. The method according to claim 1, wherein the read process utilizes multiple sense coils such as a sense coil corresponding to a drive coil.

11. The method according to claim 1, wherein the read process utilizes multiple sense coils such as one sense coil corresponding to each drive coil and the two coils are merged into one.

12. A method of statically writing data on a magnetic stripe of a magnetic stripe card that requires no card internal circuitry by externally imposing magnetic field of a given polarity on each selected segment of the magnetic stripe and of reading data by sensing the remanent field of each segment of the magnetic stripe by the Hall Effect method such that data on the magnetic stripe can also be read by a swipe magnetic card reader and interpreted as digital bits, comprising:
  (i) providing a multi-dimensional conductor array placed proximate to the magnetic stripe where each magnetic stripe segment is associated with at least one conductor
  (ii) providing current drivers for sending currents in controlled directions through the conductor array;
  (iii) sending said currents, using current drivers, through conductors of the array, such that during writing, the composite current in a conductor overcomes the coercivity of a given segment of the magnetic stripe;
  (iv) voltage sensing across each segment of the conductor array is used as part of multiple Hall Effect sensors that during reading determines at least the polarity of each segment using the Hall Effect method while the conductor arrays of each segment independently carry current that does not overcome the coercivity of the magnetic stripe;
  (v) a magnetic domain matrix addressing method for both reading from and writing onto the magnetic stripe.

13. The method according to claim 12, wherein the read process utilizes a capacitive coupling for Hall Effect output voltage sensing.

14. The method according to claim 12, wherein said multi-dimensional conductor array is a two-dimensional matrix conductor array with current steering mechanism.

15. A system for statically writing data on a magnetic stripe of a magnetic stripe card that requires no card internal circuitry by externally imposing magnetic field of a given polarity on each selected segment of the magnetic stripe, and of reading data by sensing the remanent field of each segment of the magnetic stripe by multiple fluxgate constructed with a sense coil that is external to the card such that data on the magnetic stripe can also be read by a swipe magnetic card reader and interpreted as digital bits, comprising:
  (i) a multi-dimensional conductor array placed proximate to the magnetic stripe while each segment is associated with at least one conductor;
  (ii) current drivers for sending currents in controlled directions through the conductor array;
  (iii) a device for sending said currents, using said current drivers, through conductors of the array, such that during writing, the composite current in a conductor overcomes the coercivity of a given segment of the magnetic stripe;
  (iv) a sense coil wrapped around a high permeability core that is shared with the conductor array, that during the reading process senses at least the polarity of each segment using a fluxgate method while the conductor arrays of each segment, independently, induces flux into the core using current that does not overcome the coercivity of the magnetic stripe;
  (v) a magnetic domain matrix addressing mechanism for both reading from and writing onto the magnetic stripe.

16. The system according to claim 15, wherein the read process utilizes a fluxgate method.

17. The system according to claim 15, wherein the read process utilizes a modified fluxgate method.

18. The system according to claim 15, wherein the read process utilizes multiple sense coils such as a sense coil corresponding to a drive coil.

19. The system according to claim 15, wherein the read process utilizes multiple sense coils such as one sense coil corresponding to each drive coil and the two coils are merged into one.

20. The system according to claim 15, wherein said multi-dimensional conductor array is a two-dimensional matrix conductor array with current steering mechanism.

* * * * *